United States Patent [19]

Ishimura

[11] Patent Number: 5,528,413

[45] Date of Patent: Jun. 18, 1996

[54] SEMICONDUCTOR LIGHT INTENSITY MODULATOR

[75] Inventor: Eitaro Ishimura, Itami, Japan

[73] Assignee: Mitsubishi Denki Kabushiki Kaisha, Tokyo, Japan

[21] Appl. No.: 179,712

[22] Filed: Jan. 11, 1994

[30] Foreign Application Priority Data

Feb. 12, 1993 [JP] Japan .................................. 5-023120

[51] Int. Cl.$^6$ ....................................................... G02F 1/03
[52] U.S. Cl. ........................................... 359/248; 359/245
[58] Field of Search ..................................... 359/245, 246, 359/248, 249, 250

[56] References Cited

FOREIGN PATENT DOCUMENTS

| | | |
|---|---|---|
| 0466144 | 7/1991 | European Pat. Off. . |
| 2252247 | 10/1972 | Germany . |
| 63-13017 | 1/1988 | Japan . |
| 2-22630 | 1/1990 | Japan . |
| 2-168227 | 6/1990 | Japan . |
| 369925 | 3/1991 | Japan . |

OTHER PUBLICATIONS

Mak et al, "High–Speed Bulk InGaAsP–InP Electroabsorption Modulators With Bandwidth In Excess Of 20 GHz", IEEE Photonics Technology Letters, vol. 2, No. 10, 1990, pp. 730–733.

Primary Examiner—Georgia Y. Epps
Assistant Examiner—Dawn-Marie Bey
Attorney, Agent, or Firm—Leydit, Voit & Mayer

[57] ABSTRACT

A semiconductor light intensity modulator utilizing the electric field absorbing effect, includes a light absorption layer which absorbs light due to the electric field absorption effect and a phase correcting semiconductor layer to which an electric field is applied independently from the light absorption layer, having a larger energy band gap than that of the light absorption layer disposed in the light waveguide path or in the vicinity thereof, of the semiconductor light intensity modulator.

In this construction, by adjusting the refractive index of the phase correcting semiconductor layer and the length of the light waveguide path, the change in the refractive index in the light absorption layer can be cancelled, whereby a semiconductor light intensity modulator free of phase modulation is obtained.

12 Claims, 9 Drawing Sheets

SEMICONDUCTOR LIGHT INTENSITY MODULATOR

FIELD OF THE INVENTION

The present invention relates to a semiconductor light intensity modulator and a production method thereof and, more particularly, to a modulator and method producing no phase modulation of light.

BACKGROUND OF THE INVENTION

FIG. 9(a) is a perspective view illustrating a prior art semiconductor light intensity modulator and FIG. 9(b) is a cross sectional view thereof taken along line D–D' of FIG. 9(a). In the figure, this prior art semiconductor light intensity modulator has an n type InP substrate 1 having an energy band gap corresponding to light of wavelength of λg=0.9 μm. A light absorption layer comprising undoped InGaAsP having an energy band gap corresponding to light of wavelength λg=1.4 μm is grown on the n type InP substrate 1. A p type InP layer 3 having an energy band gap corresponding to wavelength of λg=0.9 μm is grown on the light absorption layer 2. A p side electrode 4 is produced on the p type InP layer 3. An n side electrode 5 is produced on the n type InP substrate 1. The n side electrode 5 is grounded to the earth 6. A modulation signal 7 is input to the p side electrode 4.

A method of producing this prior art semiconductor light intensity modulator will be described hereinafter.

First of all, an undoped InGaAsP layer of 0.13 μm thickness having an energy band gap absorbing light of wavelength λg=1.4 μm is epitaxially grown on the n type InP substrate 1 having a dopant concentration of 5×10$^{18}$ cm$^{-3}$ and 100 μm thick, having an energy band gap corresponding to light of wavelength of λg=0.9 μm.

Next, a first photoresist mask having a width of 1.3 μm and extending in the longitudinal direction is produced on the wafer at the center of the element, and the undoped InGaAsP layer 2 is etched with $H_2SO_4$, thereby producing a light absorption layer 2 of 1.3 μm width, 0.13 μm height, and 300 μm length. After removing the first photoresist mask, a p type InP layer 3, having a dopant concentration of 1×10$^{18}$ cm$^{-3}$ and 2.13 μthick, having an energy band gap corresponding to light of wavelength λg=0.9 μm is epitaxially grown thereon.

Then, Ti of 500 Å thickness and Au of 2500 Å thickness are electron beam deposited on the p type InP layer 3 thereby to produce a Ti/Au electrode which functions as a p side electrode 4 for inputting a modulation signal 7 to the light absorption layer 2. On the other hand, AuGe of 800 Å thick and Au of 2500 Å thick are electron beam deposited on the n type InP substrate 1, thereby producing an AuGe/Au electrode which functions as an n side electrode 5.

A description is given of the operation.

FIG. 10 is a diagram illustrating the absorption spectrum obtained when an electric field is applied to between the p side electrode 4 and the n side electrode 5 in the semiconductor light intensity modulator of FIG. 9. In the figure, reference numeral (3) represents a relation between the wavelength λ and the light absorption quantity (a) when no electric field is applied between the p side electrode 4 and the n side electrode 5, reference numeral (4) represents a relation between the wavelength λ and the light absorption quantity (a) when a negative electric field is applied to the p side electrode 4 relative to the n side electrode 5. When light of wavelength 1.55 μm is incident, the light absorption amount (a) of the curve (3) when no electric field is applied to the p side electrode 4 is 0, while the width of the absorbing region of the spectrum of the curve (4) when a negative electric field is applied to the p side electrode 4 relative to the n side electrode 5 is broadened toward a longer wavelength, thereby meaning that light of wavelength 1.55 μm is absorbed by an amount of Δa.

For example, when light of wavelength 1.55 μm is incident on the facet of the modulator in a state when no voltage is applied to the light absorption layer 2, the light absorption layer 2 absorbs no light, and thereby the light is output from the opposite side facet through the light absorption layer 2 without being absorbed. Meanwhile, when a reverse bias voltage of –2 V is applied between the p type InP layer 3 and the n type InP substrate 1, thereby applying an electric field to the light absorption layer 2, the light absorption layer 2 also absorbs light of wavelength 1.55 μm which is longer than the wavelength λg=1.4 μm corresponding to the energy band gap of the light absorption layer 2, due to the electric field absorption effect.

The electric field absorption effect will be hereinafter described. This electric field absorption effect is called the "Franz-Keldysh effect". The Franz-Keldysh effect is a result of the dependence of the fundamental absorption spectrum of semiconductor or insulator on electric field, and this phenomenon was independently predicted by W. Franz and L. V. Keldysh in 1958. This Franz-Keldysh effect is due to the existence of an electric field gradient so that electrons occupying the valance band absorb light as well as transit to the conduction band due to the tunneling effect, thereby enabling absorption of light of an energy smaller than the energy band gap of the material. When an electric field is applied, the absorption the light tails become lower, toward the low energy side of the absorption edge. In addition, vibrating components appear in the absorption spectrum due to an electric field at the high energy side of the absorption edge (this is called a vibration type Franz-Keldysh effect), and these phenomena are actually observed at an electric field of about 10$^4$ V/cm for a large number of semiconductors.

As shown in FIG. 10 and as already described, this light absorption layer 2 absorbs no light of a longer wavelength than λg=1.4 μm corresponding to the energy band gap of that layer when no electric field is applied, and it even absorbs light of wavelength 1.55 μm, which is longer than λg=1.4 μm, when an electric field is applied. Further, as shown in FIG. 10, (3) when E=0, the light absorption of light of the wavelength 1.4 μm is 4000/cm and there is no absorption of the light of wavelength 1.55 μm, and (4) when E<0, the light absorption amount of the wavelength 1.4 μm is smaller than 3000/cm, but the light absorption amount Δa of the wavelength 1.55 μm is 1000/cm, where the total light absorption amount when E=0 and the total light absorption amount when E<0 are equal to each other.

As described above, the prior art semiconductor light intensity modulator utilizes the Franz-Keldysh effect, and it operates so that when a modulation signal 7 is input to the semiconductor light intensity modulator, light of a particular wavelength among the light passing through the light absorption layer 2 is absorbed depending on the reverse bias voltage applied thereto, whereby the light amount transmitted through the semiconductor light intensity modulator is varied.

The prior art semiconductor light intensity modulator is constructed as described above, and when an electric field is applied to the semiconductor, the absorption of light varies and the refractive index of the semiconductor varies, thereby changing the phase of the transmitting light, reducing the monochromaticity of the light. Accordingly, when this modulator is utilized in an optical communication system, the distance over which the transmission is possible is shortened because the phase modulation due to the variation in the refractive index accompanying the change in the light absorption.

SUMMARY OF THE INVENTION

It is an object of the present invention to provide a semiconductor light intensity modulator that does not phase modulate light.

It is another object of the present invention to provide a method for producing the above-described semiconductor light intensity modulator.

Other objects and advantages of the present invention will become apparent from the detailed description given hereinafter; it should be understood, however, that the detailed description and specific embodiment are given by way of illustration only, since various changes and modifications within the scope of the invention will become apparent to those skilled in the art from this detailed description.

According to a first aspect of the present invention, a phase correcting semiconductor layer having a larger energy band gap than the light absorption layer and that has no light absorption even when an electric field is applied is provided in the light waveguide path or in the vicinity thereof, of the semiconductor light intensity modulator, and an electric field is applied to the phase correcting semiconductor layer independently from the light absorption layer.

According to a second aspect of the present invention, a production method of a semiconductor light intensity modulator includes, epitaxially growing an undoped InGaAsP layer on the entire surface of a first conductivity type InP substrate and etching employing a resist mask, so as to produce a light absorption layer formation layer of a predetermined length in a light traveling direction;

epitaxially growing an undoped InGaAsP layer having a larger energy band gap than that of the light absorption layer formation layer employing a resist mask, so as to produce a phase correcting semiconductor layer of a predetermined length on a line extended from the light absorption layer formation layer, the light absorption layer formation layer and the phase correcting semiconductor layer formation layer being arranged parallel to each other in a direction perpendicular to the light traveling direction;

etching the light absorption layer formation layer and the phase correcting semiconductor layer to produce a light absorption layer and a phase correcting semiconductor layer employing a resist mask in stripe configurations, thereby to produce a structure in which the light emitted from the emitting facet of the light absorption layer is successively incident on the phase correcting semiconductor layer;

removing the resist mask and producing a second conductivity type InP layer by epitaxial growth;

etching to a portion of the second conductivity type InP layer at a boundary between the light absorption layer and the phase correcting semiconductor layer to produce a separation groove having a predetermined width in the light traveling direction and running in the direction perpendicular to the light traveling direction on the boundary between the light absorption layer and the phase correcting semiconductor layer;

depositing an insulating film filling the separating groove by sputtering, employing a resist mask;

producing respective electrodes for the light absorption layer and for the phase correcting semiconductor layer separately; and producing an electrode on the first conductivity type InP substrate.

In this construction, by adjusting the refractive index of the phase correcting semiconductor layer and the length of the light waveguide path, the change in the refractive index arising in the light absorption layer can be cancelled, whereby a semiconductor light intensity modulator producing no phase modulation is obtained.

DETAILED DESCRIPTION OF THE PREFERRED EMBODIMENTS

Embodiment 1

Figure 1A:
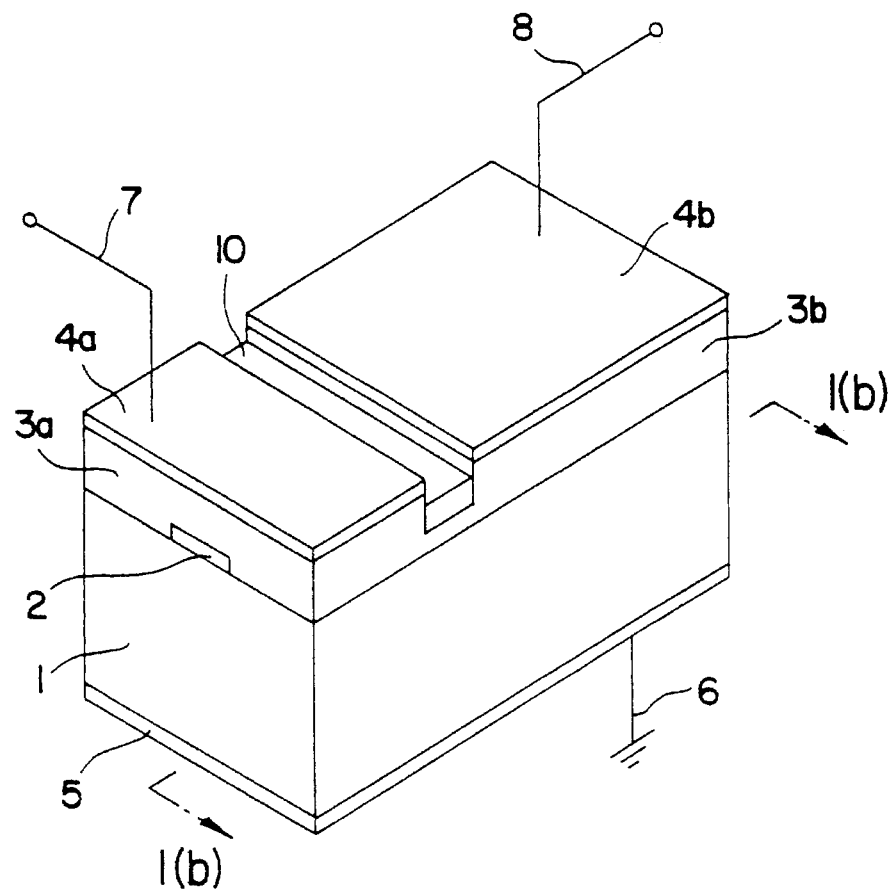
FIGS. 1(a) and 1(b) are diagrams illustrating a semiconductor light intensity modulator according to a first embodiment of the present invention.
Figure 1B:
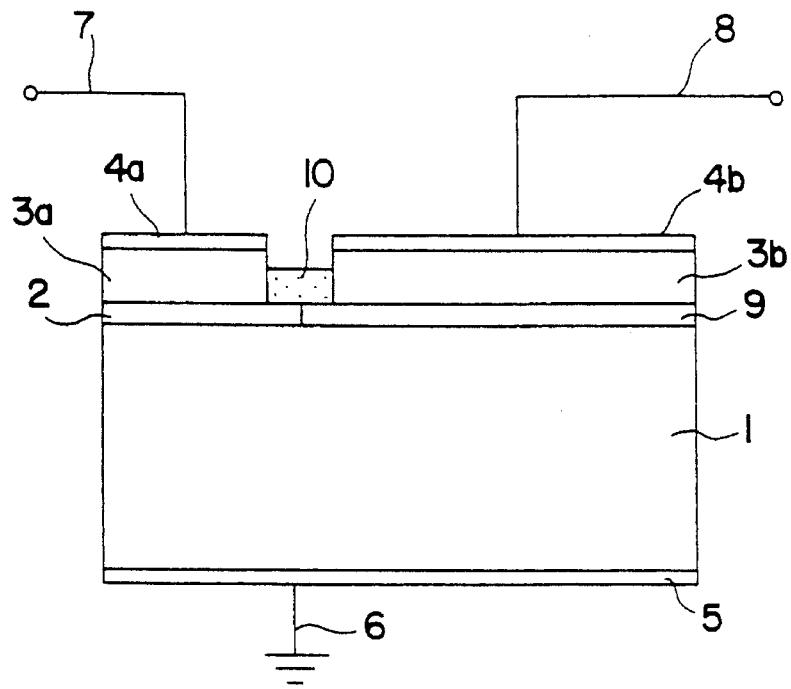

FIG. 1(a) is a perspective view illustrating a semiconductor light intensity modulator according to a first embodiment of the present invention and FIG. 1(b) is a cross sectional view of FIG. 1(a) taken along line 1b–1b in FIG. 1(a).

Figure 9A:
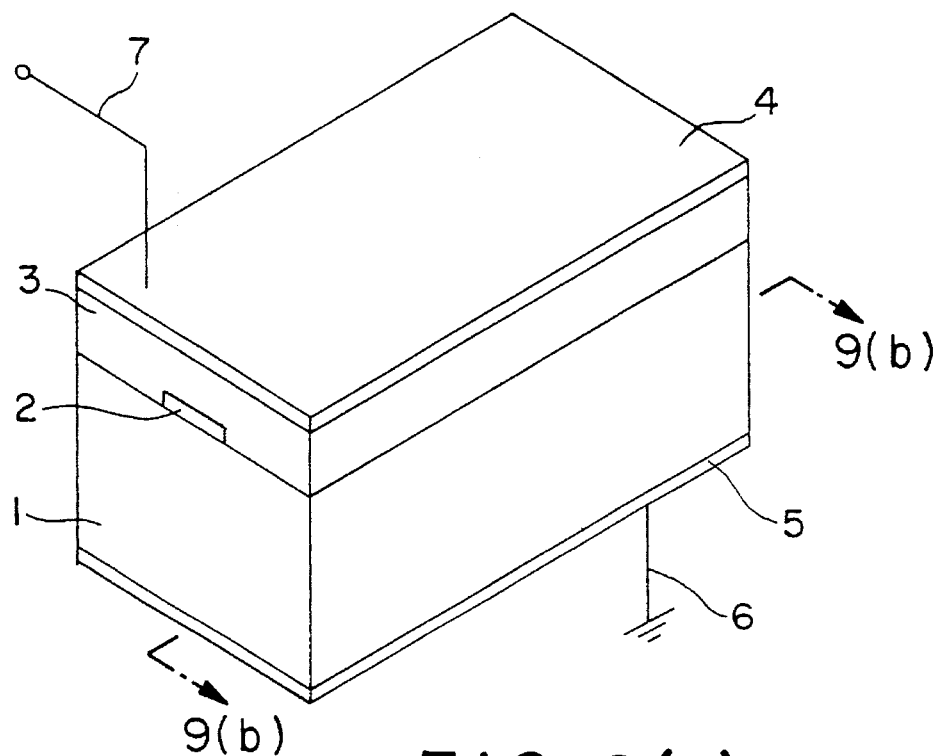
FIGS. 9(a) and 9(b) are diagrams illustrating a prior art semiconductor light intensity modulator.
Figure 9B:
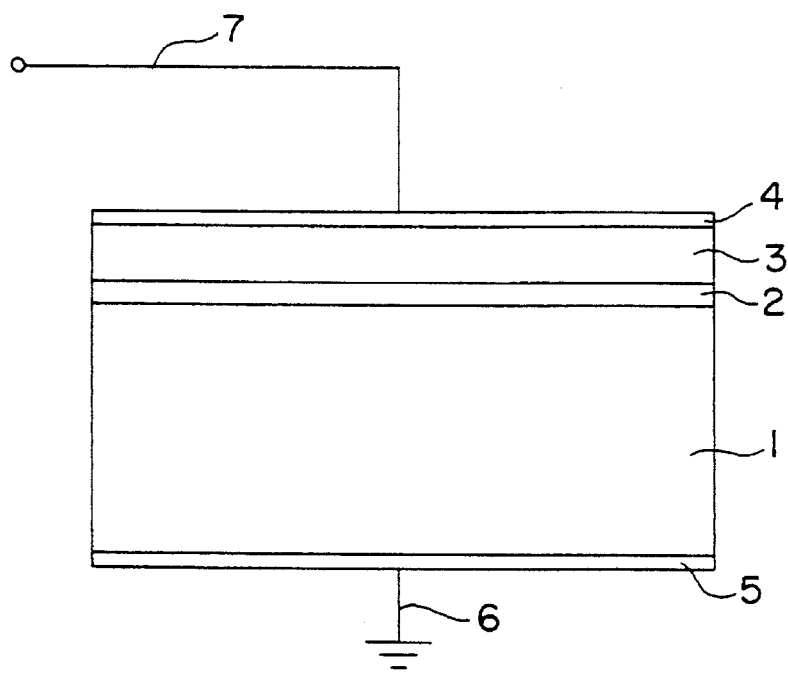
Figure 10:
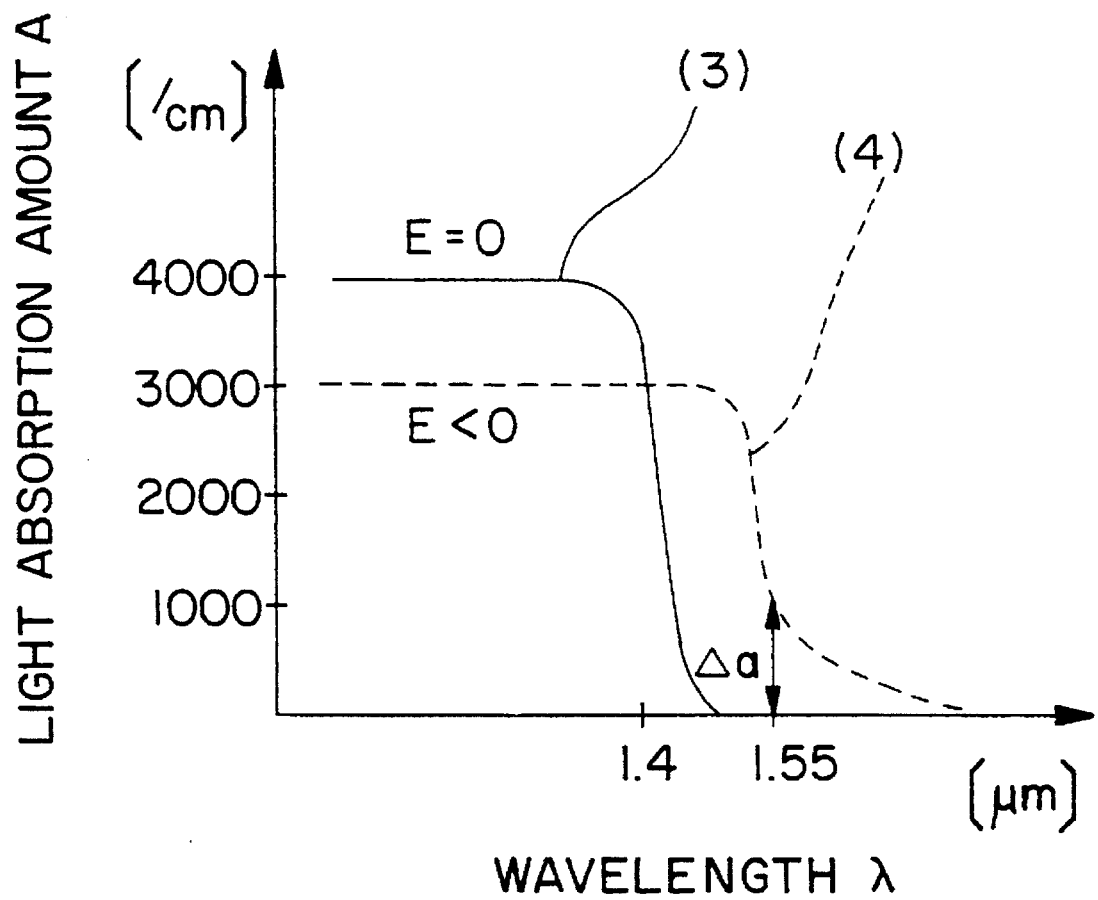
FIG. 10 is a diagram for explaining the Franz-Keldysh effect.

In the figures, the same reference numerals are used to designate the same or corresponding elements as those in FIGS. 9(a) and 9(b). In the figures reference numeral 9 designates a phase correcting semiconductor layer disposed adjacent the light absorption layer 2, having its light incident facet confronting the output facet of the light absorption layer 2 so that the output light from the output facet of the light absorption layer 2 is immediately incident on the phase correcting layer 9. This phase correcting layer 9 comprises undoped InGaAsP having an energy band gap of 0.95 eV. Because this energy band gap of 0.95 eV is larger than the energy band gap of the light absorption layer 2, while light of wavelength $\lambda g=1.3$ μm is absorbed by this phase correcting layer 9, the light of wavelength 1.55 μm cannot be absorbed even when an electric field is applied. A p type InP layer 3a is disposed on the n type InP layer 1 and the light absorption layer 2. A p type InP layer 3b is disposed on the n type InP layer 1 and the phase correcting layer 9. A p side electrode 4a comprising Ti/Au is produced on the p type InP layer 3a for applying an electric field to the light absorption layer 2. A modulation signal 7 is input to this p side electrode 4a. A p side electrode 4b comprising Ti/Au is produced on the p type InP layer 3b for applying an electric field to the phase correcting layer 9. An inverted signal 8 of the modulation signal 7 is input to this p side electrode 4b. An insulating film 10 comprising $SiO_2$ is provided between the p type InP layer 3a produced on the light absorption layer 2 and the p type InP layer 3b produced on the phase correcting layer 9 so as to electrically separate these p type InP layers 3 at the boundary where the light absorption layer 2 and the phase correcting layer 9 confront each other. Reference numerals 21 and 22 designate resist masks.

A method for producing the semiconductor light intensity modulator of the first embodiment will be described with reference to FIGS. 2(a)–2(h)

Figure 2A:
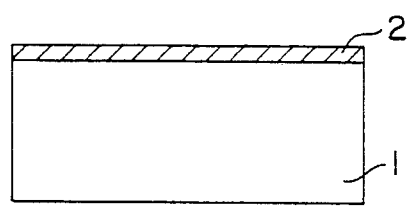
FIGS. 2(a)–2(h) are cross-sectional view illustrating a method for producing a semiconductor light intensity modulator according to the first embodiment of the present invention.

First of all, a light absorption layer 2 comprising undoped InGaAsP having an energy band gap corresponding to light of wavelength $\lambda g=1.4$ μm is epitaxially grown on the n type InP substrate 1 to a thickness of 0.13 μm, which substrate 1 has an energy band gap corresponding to the light of $\lambda g=0.9$ μm, a thickness of 100 μm, and a dopant concentration of $5\times 10^{18}$ cm$^{-3}$ (FIG. 2(a)).

Figure 2B:
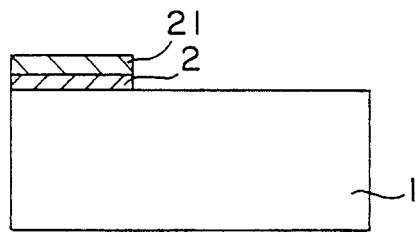

After forming a first photoresist mask 21, the light absorption layer 2 is etched using $H_2SO_4$ (FIG. 2(b)).

Figure 2C:
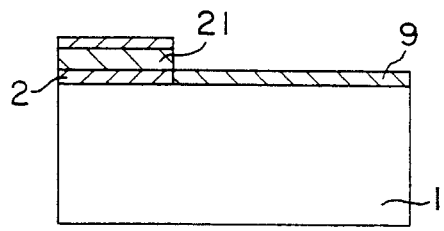

Using the first resist mask 21 used in the previous etching process as it is, a phase correcting layer 9 comprising undoped InGaAsP having an energy band gap of 0.95 eV which absorbs light of wavelength $\lambda g=1.3$ μm but does not absorb light of wavelength 1.55 μm is epitaxially grown on the n type InP substrate 1 (FIG. 2(c)).

Then, after removing the first resist mask 21 which is laminated on the light absorption layer 2, a second resist mask (not shown) is produced in the A–A' direction in figure 1(a) at the center of the element in a width of 1.4 μm on the light absorption layer 2 and in a width of 1.3 μm on the phase correcting layer 9. Employing this mask, the undoped InGaAsP layers 2, 9 are etched $H_2SO_4$, thereby producing a light absorption layer 2 of 1.4 μm width, 0.13 μm thickness, and 200 μm length and a phase correcting layer 9 of 1.3 μm width, 0.13 μm thickness, and 400 μm length on the n type InP substrate 1 in such a manner that the center line in the width direction of the light absorption layer 2 and the center line in the width direction of the phase correcting layer 9 coincide with each other. Thereby, the output facet of the light absorption layer 2 and the input facet of the phase correcting layer 9 contact each other so that the light incident on the light absorption layer 2, and output from the light absorption layer 2 is incident to the phase correcting layer 9.

Figure 2D:
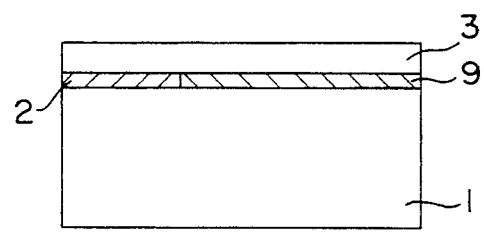

After removing the second photoresist mask, a p type InP layer 3 having an energy band gap corresponding to light of wavelength $\lambda g=0.9$ μm, 2.13 μm thick, and having a dopant concentration of $1\times 10^{18}$ cm$^{-3}$ is epitaxially grown on the n type InP substrate 1, the light absorption layer 2, and the phase correcting layer 9 (FIG. 2(d)).

Figure 2E:
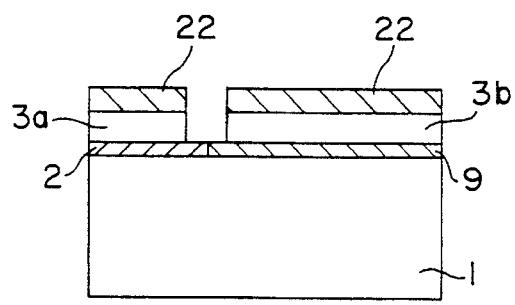

After producing the third resist mask 22, etching is carried out to the p type InP layer 3 up to a position directly above the light absorption layer 2 and the phase correcting layer 9 using HCl, thereby producing a separation groove of 5 μm width and 2 μm depth in the element width direction at the boundary between the light absorption layer 2 and the phase correcting layer 9, whereby the p type InP layer 3 is electrically separated into the portion 3a on the light absorption layer 2 and the portion 3b on the phase correcting layer 9 (FIG. 2(e)).

Figure 2F:
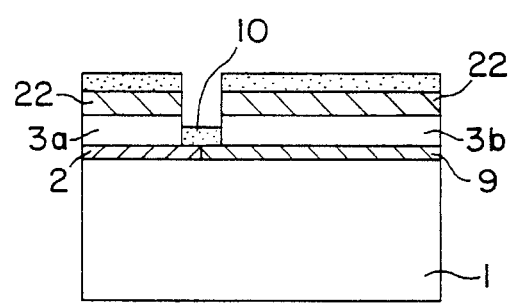

Next, a sputtering is carried out using the third photoresist mask 22 used in the above-described etching process and an insulating film 10 comprising $SiO_2$ is deposited in the separation groove (FIG. 2(f)).

Figure 2G:
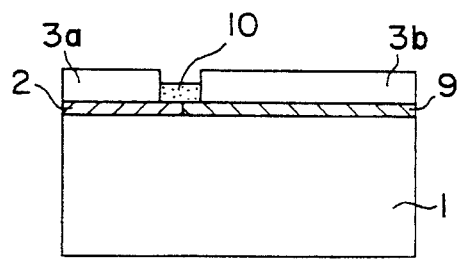
Figure 2H:
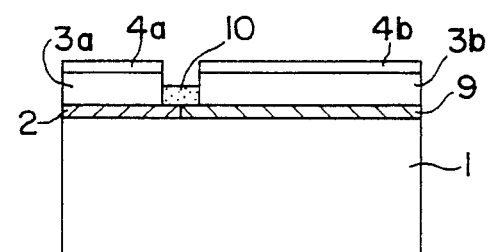

Next, the third resist mask 22 deposited on the p type InP layer 3a and 3b respectively disposed on the light absorption layer 2 and the phase correcting layer 9 are removed (FIG. 2(g)). Then, electron beam deposition of Ti of 50 nm thickness and Au of 250 nm thickness are carried out on the p type InP layer 3a, 3b, thereby producing Ti/Au electrodes. The electrode on the p type InP layer 3a functions as a p side electrode 4a that enables the modulation signal to be input to the light absorption layer 2 and the electrode on the p type InP layer 3b functions as a p side electrode 4b that enables the inverted signal 8 of the modulation signal to be input to the phase correcting layer 9. AuGe of 80 nm thickness and Au of 250 nm thickness are electron beam deposited on the n type InP substrate 1, thereby producing an AuGe/Au electrode, which functions as an n side electrode 5 (FIG. 2(h)).

A description is given of the operation of this first embodiment.

Figure 3:
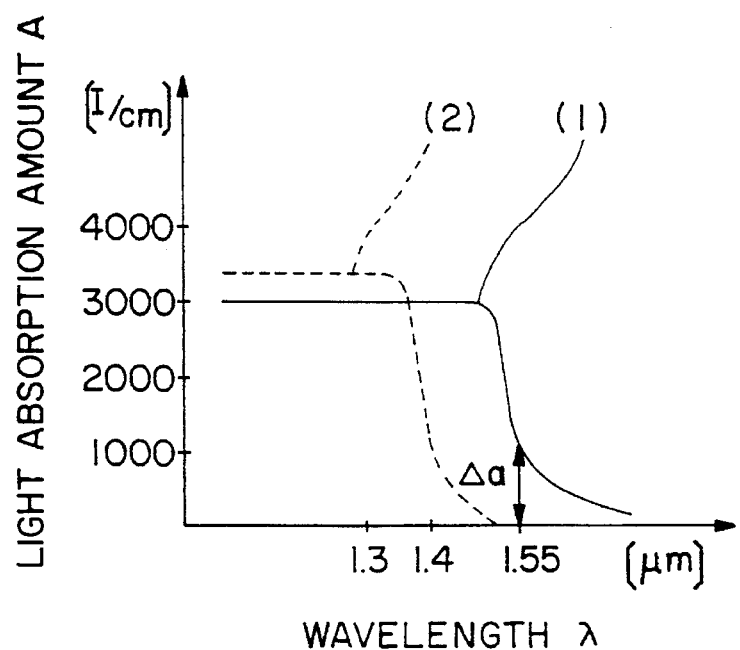
FIG. 3 is a diagram illustrating the absorption spectrum of the light absorption layer and the phase correcting layer when an electric field is applied to the semiconductor light intensity modulator of the first embodiment.
Figure 4:
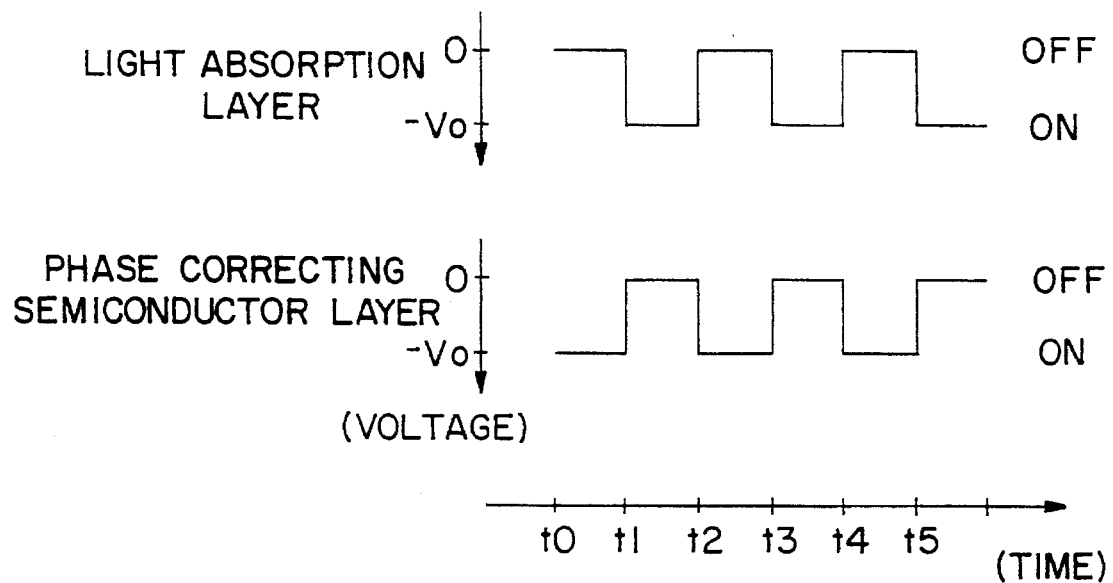
FIG. 4 is a diagram illustrating timing when an electric field is applied to the light absorption layer and the phase correcting layer in the semiconductor light intensity modulator of the first embodiment.

FIG. 3 shows the light absorption spectrum of the light absorption layer 2 and the phase correcting layer 9 when an electric field is applied, and FIG. 4 is a timing diagram showing the relation between the voltage and timing when a modulation signal 7 is input to the light absorption layer 2 and an inverted signal 8 is input to the phase correcting layer 9. Table 1 shows the absorption of light at the light absorption layer 2 and the phase correcting layer 9 when an electric field is applied and when no electric field is applied, and the refractive indices of these layers then. In table 1, the refractive indices of light in the light absorption layer 2 and the phase correcting layer 9 when no electric field is applied are respectively n01 and n02, and the refractive indices when an electric field is applied are respectively n01+Δn1 and n02+Δn2.

When a negative electric field is applied alternatingly to the electrode 4a and the electrode 4b discontinuously in such a manner that a voltage is applied to the electrode 4a when no voltage is applied to the electrode 4b and no voltage is applied to the electrode 4a when a voltage is applied to the electrode 4b, as shown in the timing chart of FIG. 4 showing modulation signal 7 and an inverted signal 8 of the modulation signal, a reverse bias voltage is applied alternatingly to the light absorption layer 2 and the phase correcting layer 9 discontinuously.

TABLE 1

|  | light absorption layer($\lambda g$ = 1.4 μm) | | phase correcting layer($\lambda g$ = 1.3 μm) | |
| --- | --- | --- | --- | --- |
|  | absorption | refractive index | absorption | refractive index |
| no electric field | no absorption | n01 | no absorption | n02 |
| electric field is applied | $\Delta a$ | n01 + $\Delta n1$ | no adsorption | n02 + $\Delta n2$ |

When a reverse bias voltage is applied, the light absorption layer 2 absorbs the light of wavelength 1.55 μm where the light absorption amount is $\Delta a$, while the phase correcting layer 9 does not absorb the light of wavelength 1.55 μm as shown in FIG. 3.

As shown in table 1, when the refractive index of the light absorption layer 2 increases by $\Delta n1$ because of the voltage application, the phase of the guided light varies and the phase variation amount $\Delta\phi 1$ of the light absorption layer 2 is represented by $$\Delta\phi 1 = (\Delta n1 \times L1/\lambda) \times 2\pi,$$

where, L1 is the waveguide length of the light absorption layer 2 and $\lambda$ is the wavelength of the guided light ($\lambda$=1.55 μm).

When the refractive index of the phase correcting layer 9 increases because $\Delta n2$ by the voltage application, the phase of the guided light varies and the phase variation amount $\Delta\phi 2$ of the phase correcting layer 9 becomes $$\Delta\phi 2 = (\Delta n2 \times L2/\lambda) \times 2\pi,$$

where, L2 is the waveguide length of the phase correcting layer 9.

If no electric field is applied to the phase correcting layer 9 when a negative electric field is applied to the light absorption layer 2, and a negative electric field is applied to the phase correcting layer 9 when no electric field is applied to the light absorption layer 2, then the phase variation amount as a whole of the semiconductor light intensity modulator becomes, $$|\Delta\phi 1 - \Delta\phi 2|.$$

Therefore, when it is set as in the formula (1)

$$|\Delta\phi 1 - \Delta\phi 2| = 0, \qquad (1)$$

the phase of the light does not vary. Accordingly, from the following formula, $$\Delta\phi 1 - \Delta\phi 2 = (\Delta n1 \times L1 - \Delta n2 \times L2) \times 2\pi/\lambda = 0,$$

it becomes $$\Delta n1 \times L1 - \Delta n2 \times L2 = 0$$

$$L2 = (\Delta n1/\Delta n2) = L1, \qquad (2)$$

by providing the waveguide length L1, L2 of the light absorption layer 2 and the phase correcting layer 9 satisfying the formula (2), the formula (1) is satisfied and a semiconductor light intensity modulator having no phase variation is obtained. In this embodiment, because the light absorption layer 2 and the phase correcting layer 9 having refractive indices of $$\Delta n1 = 2\Delta n2, \qquad (3)$$

are employed, there is a relation between the waveguide length L1 and L2 of the light absorption layer 2 and the phase correcting layer 9 as in the following $$L2 = 2L1. \qquad (4)$$

As described above, by providing the light absorption layer 2 and the phase correcting layer 9 which have waveguide lengths satisfying the formula (2) and arranged successively with the output facet of the light absorption layer confronting the input facet of the phase correcting layer 9 in such a manner that the light is incident on the light absorption layer 2 and is output from the phase correcting layer 9, and that the modulation signal 7 is applied to the light absorption layer 2 via the p side electrode 4a and the inverted signal 8 of the modulation signal 7 is applied to the phase correcting layer 9 via the p side electrode 4b, an intensity modulated light having no phase modulation is obtained.

When 0 voltage is applied to the p side electrode 4a of the light absorption layer 2 in the initial time from t0 to t1 and a reverse bias voltage −V0 is applied to the p side electrode 4b of the phase correcting layer 9 at the same time as shown in FIG. 4, the light of wavelength 1.55 μm is not absorbed by the light absorption layer 2 because no electric field is applied thereto and the refractive index thereof is n01, while because a reverse bias voltage of −V0 is applied to the phase correcting layer 9, the refractive index thereof is n02+$\Delta n2$. In the next time from t1 to t2, a reverse bias voltage −V0 is applied to the light absorption layer 2, and the light of wavelength 1.55 μm is absorbed thereby, and the refractive index thereof is n01+$\Delta n1$, while the phase correcting layer 9 presents a refractive index of n02 because no electric field is applied thereto. Similar operations are as follows.

For example, a modulation signal 7, being −2 V in ON state and being 0 V in OFF state as a reverse bias voltage and an inverted signal 8 of the modulation signal 7 are respectively applied to the light absorption layer 2 and the phase correcting layer 9, thereby providing a state where a reverse bias voltage −2 V is applied to the light absorption layer 2 and no voltage is applied to the phase correcting layer 9, and another state where no voltage is applied to the light absorption layer 2 and a reverse bias voltage −2 V is applied to the phase correcting layer 9 is provided when the modulation signal 7 is OFF and the inverted signal 8 is ON, and these two states appear alternatingly with each other, realizing repeated switching of these states.

In the above illustrated embodiment, the light of wavelength 1.55 μm is used for optical communication, and undoped InGaAsP having an energy band gap which does not absorb the light of wavelength 1.55 μm when no electric field is applied and does absorb the same when an electric field is applied, is employed for the light absorption layer 2. An undoped InGaAsP having a significant larger energy band gap which does not absorb the light of wavelength 1.55 μm upon application of an electric field is used for the phase correcting layer 9 with this layer 9 provided in an extended line of the waveguide path of the light absorption layer 2, and this light absorption layer 2 and the phase correcting layer 9 are produced to have the waveguide length L1 and L2 satisfying the formula (2). Also in a case where the other wavelength light is used for the optical communication, undoped InGaAsP having an energy band gap appropriate for the light of that wavelength can be employed considering the refractive indices and the waveguide lengths of the light absorption layer 2 and the phase correcting layer 9.

In the semiconductor light intensity modulator of this first embodiment, a phase correcting layer 9 having an energy band gap corresponding to light of wavelength λg=1.3 μm which is larger than the energy band gap of the light absorption layer 2 and does not absorb light even when a voltage is applied, is arranged with the light absorption layer 2 in the same direction as the light traveling direction, and reverse bias voltages repeating ON/OFF and having inverted phases from each other are respectively applied to the light absorption layer 2 and the phase correcting layer 9, whereby the refractive index of the phase correcting layer 9 varies so as to cancel the variation in the refractive index of the light absorption layer 2, and intensity modulated light having no phase modulation is obtained.

Embodiment 2.

Figure 5:
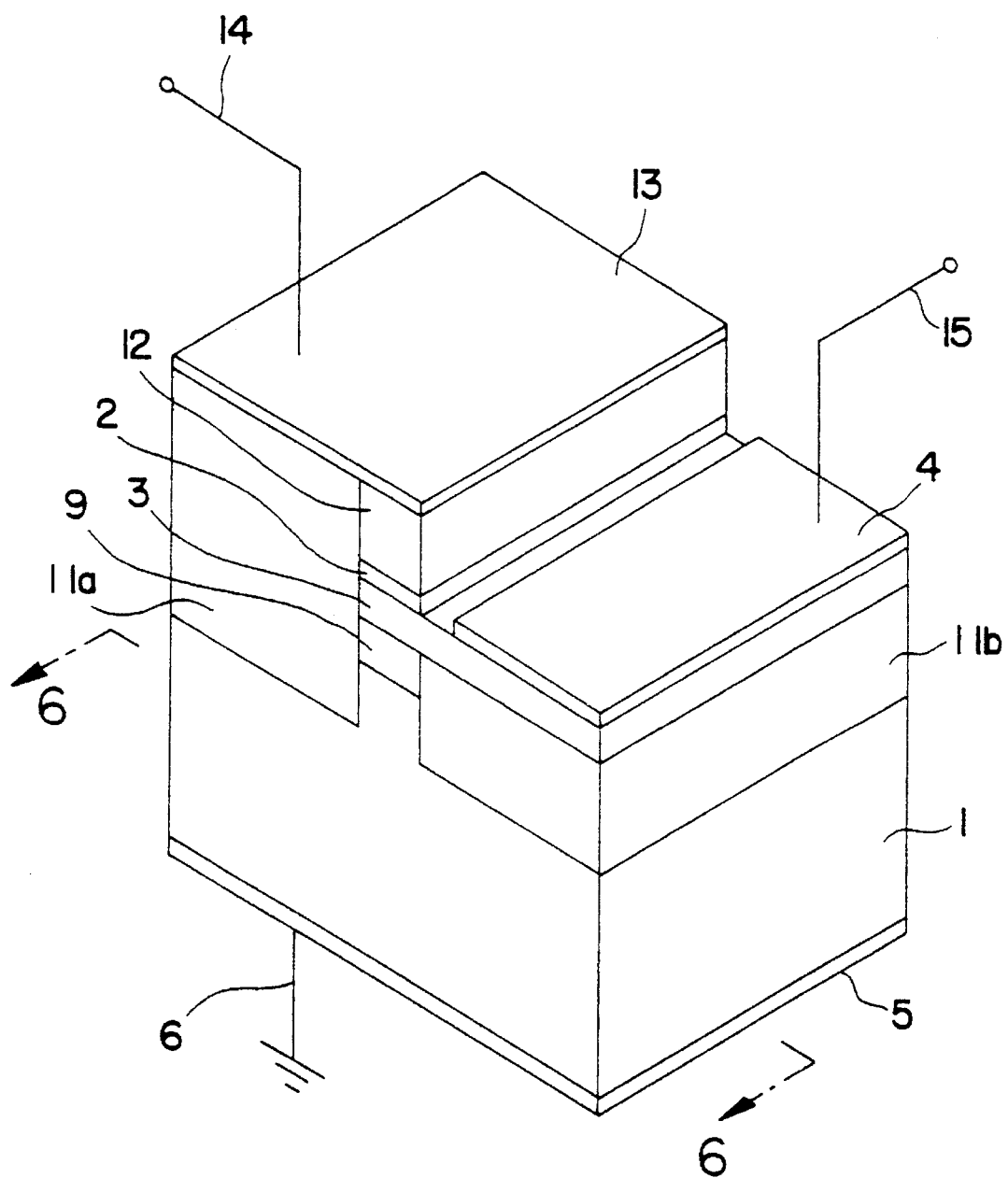
FIG. 5 is a perspective view illustrating a semiconductor light intensity modulator according to a second embodiment of the present invention.

FIG. 5 is a perspective view illustrating a semiconductor light intensity modulator according to a second embodiment of the present invention and FIGS. 6(a)–6(h) are cross sectional views taken along line 6–6' of FIG. 5 for explaining the production method of the semiconductor light intensity modulator. Reference numeral 11 designates an insulating layer. Reference numeral 12 designates an n type InP layer. Reference numeral 13 designates an n side electrode, reference numerals 14 and 15 designate lead wires, and reference numerals 23, 24, and 25 designate resist masks comprising $SiO_2$.

The phase correcting layer 9 of the semiconductor light intensity modulator of this second embodiment is provided approximately at the center of the upper surface of the n type InP substrate 1, and a p type InP layer 3 having the same length and a wider width is provided thereon, a light absorption layer 2 having the same configuration as the phase correcting layer 9, disposed thereon, and an n type InP layer 12 disposed laminated thereon. Further, a p side electrode 4 is provided on the upper surface of the p type InP layer 3 disposed on the phase correcting layer 9, and an insulating layer 11b is disposed below the p type InP layer 3, below the p side electrode 4, in contact with the facet in the longitudinal direction of the phase correcting layer 9. Further, an n side electrode 13 having the same length and a larger width than the n type InP layer 12 is disposed on the n type InP layer 12, and another insulating layer 11a is disposed below the n side electrode 13 parallel to the n type InP layer 12 in contact with the facet in the longitudinal direction of the light absorbing layer 2, the p type InP layer 3, and the phase correcting layer 9.

A description is given of the production method of a semiconductor light intensity modulator of this second embodiment with reference to FIGS. 6(a)–6(h)

Figure 6A:
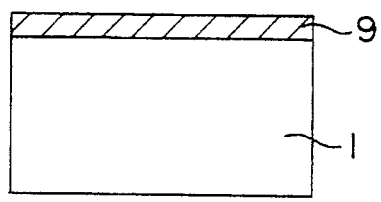
FIGS. 6(a)–6(f) are cross-sectional view illustrating a method for producing a semiconductor light intensity modulator according to the second embodiment.

On an n type InP substrate 1 having a thickness of 100 μm, a width of 300 μm, a length of 200 μm, and a dopant concentration of $5 \times 10^{18}$ cm$^{-3}$, and having an energy band gap absorbing light of wavelength λg=0.9 μm, an undoped InGaAsP layer of 0.26 μm thickness having an energy band gap of 0.95 eV, which absorbs light of wavelength λg =1.3 μm, but does not absorb light of wavelength 1.55 μm, is epitaxially grown, thereby producing a phase correcting layer 9 (FIG. 6(a)).

Figure 6B:
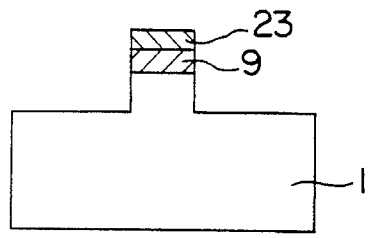

After producing a first resist mask 23 comprising $SiO_2$, the phase correcting layer 9 is etched using $H_2SO_4$, and further the n type InP substrate 1 is etched to a depth of 1 μm by using HCl (FIG. 6(b)).

Figure 6C:
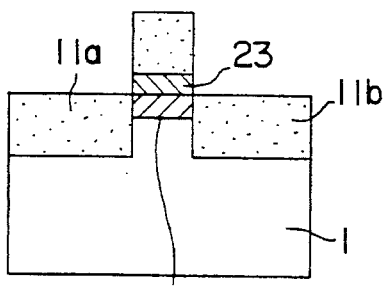

Using the first resist mask 23 used in the above etching process an Fe doped InP layer having a thickness of 1 μm and an Fe dopant concentration of $5 \times 10^{18}$ cm$^{-3}$ is epitaxially grown on the n type InP substrate 1, thereby producing insulating layers 11a and 11b (FIG. 6(c)).

Figure 6D:
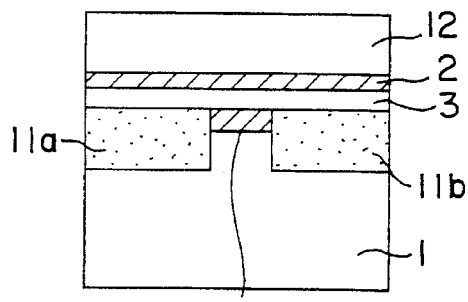

After removing the first resist mask 23 laminated on the phase correcting layer 9, a p type InP layer 3 having a thickness of 2.0 μm and a dopant concentration of $1 \times 10^{18}$ cm$^{-3}$, and having an energy band gap corresponding to light of wavelength λg=0.9 μm is epitaxially grown on the phase correcting layer 9 and the insulating layers 11a and 11b, and a light absorption layer 2 comprising undoped InGaAsP layer of 0.13 μm thickness and having an energy band gap absorbing light of wavelength λg=1.4 μm is epitaxially grown on the p type InP layer 3, an n type InP layer 12 having a thickness of 0.2 μm and a dopant concentration of $5 \times 10^{18}$ cm$^{-3}$ and having an energy band gap corresponding to light of wavelength λg=0.9 μm is epitaxially grown on the light absorbing layer 2 (FIG. 6(d)).

Figure 6E:
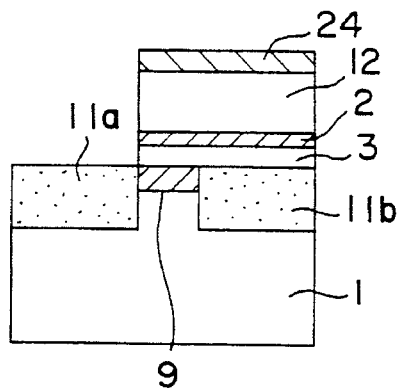

After producing a second resist mask 24, the n type InP layer 12, the light absorbing layer 2, and the p type InP layer 3 laminated on the insulating layer 11a are removed by etching employing HCl, $H_2SO_4$, and HCl, respectively (FIG. 6(e)).

Figure 6F:
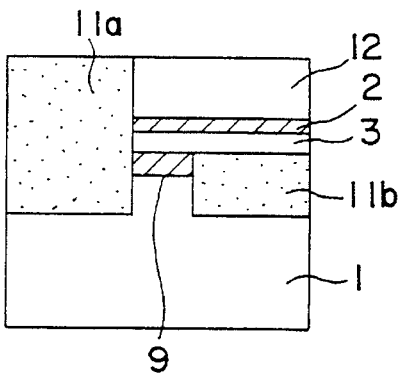

Employing the second resist mask 24 used in the above described etching process, an Fe doped InP layer having an Fe dopant concentration of $5 \times 10^{18}$ cm$^{-3}$ is epitaxially grown on the insulating layer 11a, an insulating layer 11a of 3.33 μm thickness is produced thereon, and the second resist mask 24 laminated on the n type InP layer 12 is removed (FIG. 6(f)).

Figure 6G:
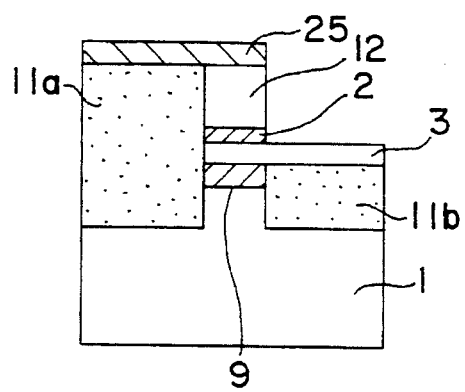

After producing the third resist mask 25, the n type InP layer 12 and the light absorbing layer 2 located above the insulating layer 11b are respectively removed by etching using HCl and $H_2SO_4$, respectively (FIG. 6(g)).

Figure 6H:
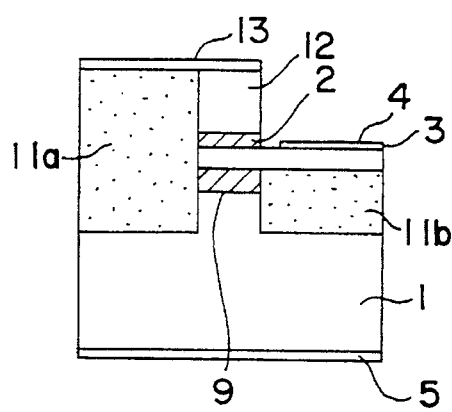

After removing the third resist mask 25 laminated on the insulating layer 11a and the n type InP layer 12, AuGe of 80 nm (800 Å) thickness and Au of 250 nm thickness are successively electron beam deposited, thereby producing AuGe/Au electrode 13, and further Ti of 50 nm thickness and Au of 250 nm thickness are successively electron beam deposited on the p type InP layer 3, thereby producing a p side electrode 4 comprising Ti/Au, and then AuGe of 80 nm thickness and Au of 250 nm thickness are successively deposited on the n type InP substrate 1, thereby producing an n side electrode 5 a AuGe/Au electrode (FIG. 6(h)).

A description is given of the operation.

The light transmission in such semiconductor light intensity modulator is distributed over both the light absorption layer 2 and the phase correcting layer 9. This transmitted light is sensitive to both of the refractive index changes of the light absorption layer 2 and the phase correcting layer 9, whereby the phase modulation of the light generated in the light absorption layer 2 is phase corrected in the phase correcting layer 9, thereby canceling the phase modulation. Suppose that the waveguide lengths of the light absorption layer 2 and the phase correcting layer 9 be L1 and L2, respectively, and the variation amounts of the refractive indices due to the voltage application be Δn1 and Δn2, respectively. When the light absorption layer 2 and the phase correcting layer 9 have the waveguide length L1 and L2, respectively, which satisfies the formula (2) presented in the first embodiment, a semiconductor light intensity modulator having no phase variation is obtained. Because the waveguide lengths L1 and L2 of the light absorption layer 2 and the phase correcting layer 9 have the same values in this second embodiment, when the light absorption layer 2 and the phase correcting layer 9 have their thicknesses in proportion to the waveguide lengths L1 and L2, respectively, the same effects as in the first embodiment are obtained.

Since the light absorption layer 2 and the phase correcting layer 9 have the same constructions as in the first embodiment, the variations in the refractive indices of the light absorption layer 2 and the phase correcting layer 9 have the same relation as in the first embodiment as shown below $$\Delta n1 = 2\Delta n2, \quad (3)$$

and the waveguide lengths L1 and L2 of the light absorption layer 2 and the phase correcting layer 9 are in a relation of $$L2 = 2L1. \quad (4)$$

Accordingly, the layer thickness of the phase correcting layer 9 is twice that of the light absorption layer 2, and as shown in this second embodiment, the layer thicknesses of the light absorption layer 2 and the phase correcting layer 9 may be 0.13 μm and 0.26 μm, respectively.

As methods for applying electric fields to the light absorption layer 2 and the phase correcting layer 9, a voltage of repeating $V_0$ volts and 0is applied to the light absorption layer 2 as a reverse bias voltage, and a voltage of repeating 0 and $V_0$ volts is applied to the phase correcting layer 9 as a forward bias voltage. Thereby, the same effects as in the first embodiment where a modulation signal 7 comprising $-V_0$ V and 0 V and its inverted signal 8 are input are obtained.

For example, when an inverted signal 15 which is 2 V in ON state and 0 V in OFF state is applied to the p side electrode 4, a reverse bias voltage 2 V is applied to the light absorption layer 2 and 0 V is applied to the phase correcting layer 9 when the inverted signal 15 is OFF, and 0V is applied to the light absorption layer 2, a forward bias voltage is applied to the phase correcting layer 9 when the inverted signal 15 is ON, whereby the same direction voltages are alternatingly applied to the light absorption layer 2 and the phase correcting layer 9.

In the semiconductor light intensity modulator of this second embodiment, the phase correcting layer 9 is disposed below the light absorption layer 2, parallel to the light absorption layer 2, with the p type InP layer 3 therebetween, and a voltage is alternatingly applied to the light absorption layer 2 and the phase correcting layer 9, whereby the intensity modulated light having no phase modulation is obtained with the same effects as in the first embodiment.

Embodiment 3

Figure 7:
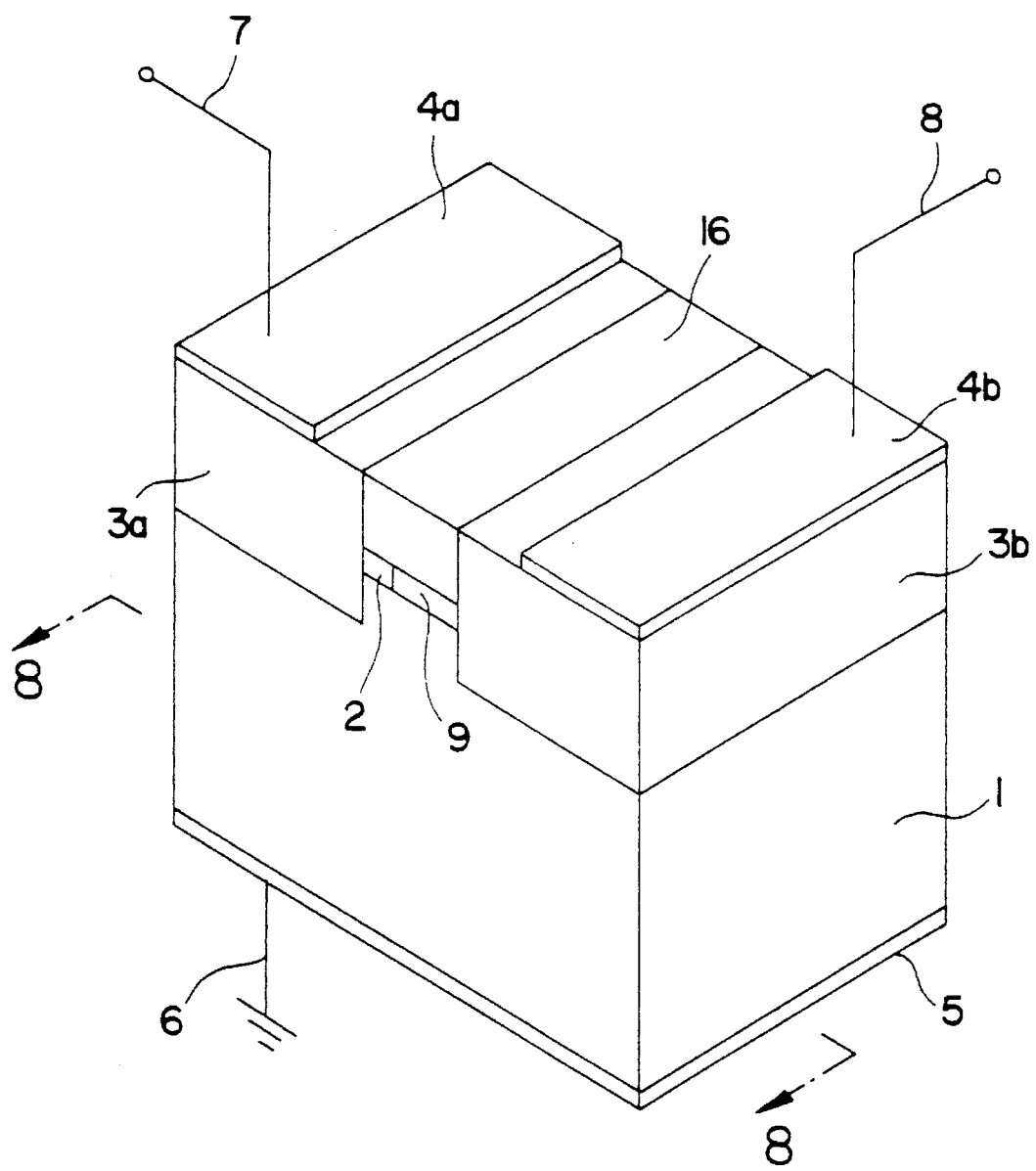
FIG. 7 is a perspective view illustrating a semiconductor light intensity modulator according to a third embodiment of the present invention.

FIG. 7 shows a perspective view illustrating a semiconductor light intensity modulator according to a third embodiment of the present invention. FIGS. 8(a)–8(h) are sectional views taken along line 8–8 of FIG. 7 illustrating the production method thereof. In both figures, the same reference numerals as those in FIG. 1 designate the same or corresponding portions. Reference numeral 16 designates an insulating layer and reference numerals 26 and 27 designate resist masks.

The phase correcting layer 9 of this third embodiment is disposed at approximately the center of the n type InP substrate 1, adjacent the light absorption layer 2, with both facets in the longitudinal direction in contact with each other. In addition, p type InP layers 3a and 3b are disposed with their facets in contact with facets, in the longitudinal direction, of the light absorption layer 2 and the phase correcting layer 9 respectively and symmetrically at the left and right. P side electrodes 4a and 4b are respectively disposed at the upper surfaces of the p type InP layer 3a and 3b, respectively, an n side electrode 5 is disposed on the n type InP substrate 1, and an insulating layer 16 is disposed on the upper surface of the light absorption layer 2 and the phase correcting layer 9. A modulation signal 7 applied to the light absorption layer 2 is input to the p side electrode 4a and an inverted signal 8 of the modulation signal 7 to be applied to the phase correcting layer 9 is digital input to the p side electrode 4b, and the n side electrode 5 is grounded to the earth 6.

A description is given of the production method of the semiconductor light intensity modulator of the third embodiment with reference to FIGS. 8(a)–8(h).

Figure 8A:
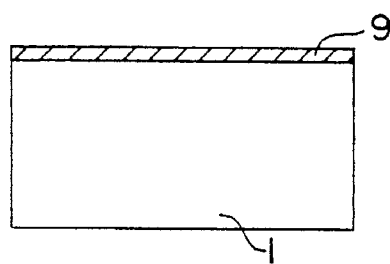
FIGS. 8(a)–8(h) are cross-sectional view illustrating a method for producing a semiconductor light intensity modulator according to the third embodiment of the present invention.

On the n type InP substrate 1 having a thickness of 100 μm, a width of 300 μm, a length of 200 μm, and a dopant concentration of $5\times10^{18}$ cm$^{-3}$ and having an energy band gap corresponding to light of wavelength λg=0.9 μm, an undoped InGaAsP layer of 0.13 μm thickness having an energy band gap of 0.95 eV corresponding to light of wavelength of λg=1.3 μm which has a larger energy band gap than the light absorption layer 2 and does not absorb the light of wavelength 1.55 μm when a voltage is applied, is epitaxially grown, thereby producing the phase correcting layer 9 (FIG. 8(a)).

Figure 8B:
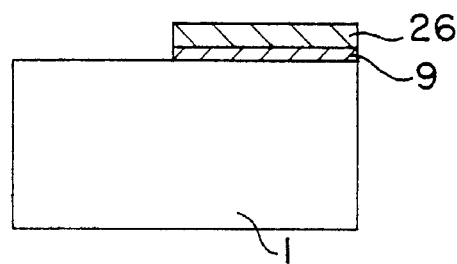
Figure 8C:
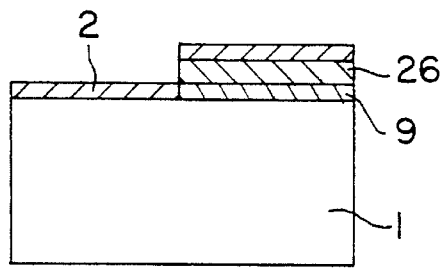

After forming a first resist mask 26 comprising SiO$_2$, the phase correcting layer 9 on the n type InP substrate 1 is etched by using H$_2$SO$_4$ (FIG. 8(b)). Employing the first resist mask 26 used in the above described etching process, a light absorption layer 2 comprising an undoped InGaAsP layer of 0.13 μm thickness having an energy band gap absorbing light of wavelength λg=1.4 μm is epitaxially grown on the n type InP substrate 1 (FIG. 8(c)).

Figure 8D:
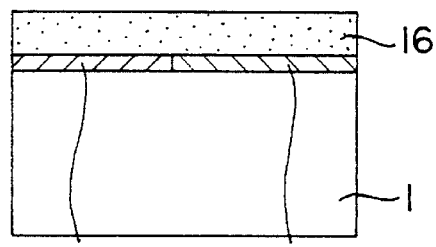

After removing the first resist mask 26 laminated on the phase correcting layer 9, an Fe doped InP layer of 3 μm thickness and an Fe dopant concentration of $5\times10^{18}$ cm$^{-3}$ is epitaxially grown on the light absorption layer 2 and the phase correcting layer 9, thereby producing an insulating layer 16 (FIG. 8(d)).

Figure 8E:
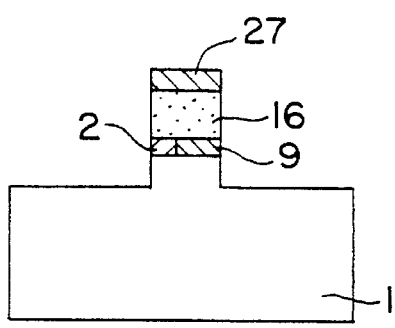

After forming a second resist mask 27, the insulating layer 16 laminated on the n type InP substrate 1, and portions of the light absorption layer 2 and the phase correcting layer 9 are removed by etching using bromomethanol so that the width of the remaining light absorption layer 2 is 0.5 μm and the width of the remaining phase correcting layer 9 is 1.0 μm (FIG. 8(e)).

Figure 8F:
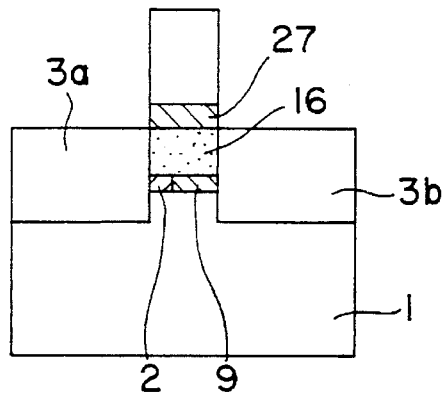

Employing the second resist mask 27 used in the above described etching process, p type InP layers 3a and 3b of 4.0 μm thickness, having a dopant concentration of $1\times10^{18}$ cm$^{-3}$, and having an energy band gap corresponding to light of wavelength λg=0.9 μm are epitaxially grown (FIG. 8(f)).

Figure 8G:
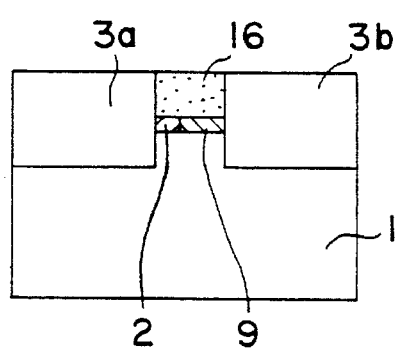

The second resist mask 27 laminated on the insulating layer 16 is removed (FIG. 8(g)).

Figure 8H:
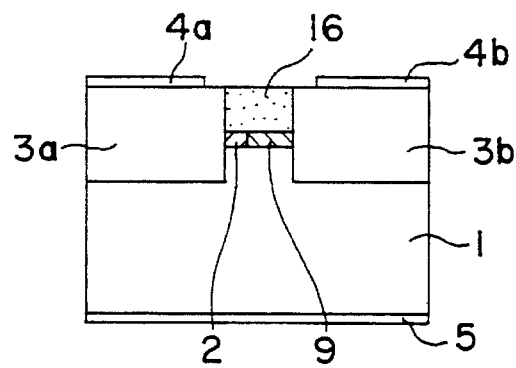

Ti of 50 nm thickness and Au of 250 nm thickness are successively electron beam deposited on the p type InP layer 3a and 3b thereby to produce a Ti/Au electrode, so that the electrode on the p type InP layer 3a serves as a p side electrode 4a for the light absorption layer 2 and the electrode on the p type InP layer 3b serves as a p side electrode 4b for the phase correcting layer 9, and thereafter AuGe of 80 nm thickness and Au of 250 nm thickness are electron beam deposited on the n type InP substrate 1, thereby forming an AuGe/Au electrode serving as an n side electrode 5 (FIG. 8(h)).

A description is given of the operation.

The light transmitted in such semiconductor light intensity modulator is distributed over both of the light absorption layer 2 and the phase correcting layer 9 as in to the second embodiment, and this light senses the refractive index variations at both of the light absorption layer 2 and the phase correcting layer 9, whereby the phase modulation of the light generated in the light absorption layer 2 is phase corrected in the phase correcting layer 9, thereby canceling the phase modulation.

Suppose that the waveguide lengths of the light absorption layer 2 and the phase correcting layer 9 are L1 and L2, respectively, and the variation amount in the refractive index due to the voltage application are $\Delta n1$ and $\Delta n2$, respectively, by providing waveguide lengths L1 and L2 of the light absorption layer 2 and the phase correcting layer 9 satisfying the formula (2) as presented in the first embodiment, a semiconductor light intensity modulator having no phase variation is obtained. Because the waveguide lengths L1 and L2 and the layer thicknesses of the light absorption layer 2 and the phase correcting layer 9 are equal to each other in the third embodiment, by providing the widths of the layers 2 and 9 in proportion to the values of waveguide lengths L1 and L2, respectively, the same effects as in the first embodiment are obtained.

For example, because the light absorption layer 2 and the phase correcting layer 9 have the same constructions as those in the first embodiment, the variation amounts of the refractive indices of the light absorption layer 2 and the phase correcting layer 9 have a relation of $$\Delta L1 = 2\Delta n2, \qquad (3)$$

with the waveguide lengths L1 and L2 of the light absorption layer 2 and the phase correcting layer 9 being as follows $$L2 = 2L1. \qquad (4)$$

Accordingly, the width of the layer of the phase correcting layer 9 is twice that of the light absorption layer 2, and as illustrated in the third embodiment, the width of the layers of the light absorption layer 2 and the phase correcting layer 9 can be respectively 0.5 µm and 1.0 µm.

Next, as for the method of applying electric fields to the light absorption layer 2 and the phase correcting layer 9, a modulation signal 7 comprising $V_0$ volts and 0 and an inverted signal 8 of the modulation signal 7 are applied respectively as in the first embodiment.

According to this third embodiment of the present invention, the light absorption layer 2 and the phase correcting layer 9 are arranged in parallel to each other in the light advancing direction, and the modulation signal 7 is input to the light absorption layer 2 via the p side electrode 4a and the inverted signal 8 is input to the phase correcting layer 9 via the p side electrode 4b. Thereby, the same operation as that presented in the timing chart of FIG. 3 for the first embodiment is performed, whereby intensity modulated light having no phase modulation is produced with the same effects as in the first embodiment.

Japanese Published Patent Application Sho. 63-13017 discloses a light amplitude phase modulator in which the intensity of light is modulated without a change in the phase of the light. However, this publication does not perform light intensity modulation utilizing the Franz-Keldysh effect in the light absorbing layer as in the present invention, add also an effect of operating at a smaller voltage is not obtained.

Japanese Published Patent Application Hei. 2-168227 discloses a light phase modulator in which a plurality of electrodes are divided for respective light waveguides having an MQW structure. However, this publication does not disclose a semiconductor light intensity modulator having a light absorption layer and a phase correcting layer on the light waveguide as in the present invention, and an effect of light intensity modulation having no phase modulation is not obtained.

Japanese Published Patent Application Hei. 2-22630 discloses a light phase distribution control element in which the distribution of carriers generated in the light waveguide is controlled to converge or diverge the light. However, this publication does not disclose a semiconductor light intensity modulator having a light absorption layer and a phase correcting layer on the light waveguide, and an effect of light intensity modulation having no phase modulation is not obtained.

As is evident from the foregoing description, according to the present invention, a phase correcting layer that has a larger energy band gap than the light absorption layer and does not absorb light even with a voltage applied, is provided in the vicinity of the light absorption layer thereby to cancel the phase change in the light absorption layer. Therefore, an intensity modulated light having no phase modulation is obtained and a high performance and high reliability semiconductor light intensity modulator is obtained.

A to a production method of a semiconductor light intensity modulator of the present invention, includes a process of forming a light absorption layer which absorbs the light due to the Franz-Keldysh effect on an n type InP substrate, a process of forming a phase correcting layer having a larger energy band gap than the light absorption layer with its incident facet confronting the output facet of the light absorption layer so that the output light from the light absorption layer is directly incident on the phase correcting layer, a process of producing a separation groove on the boundary between the light absorption layer and the phase correcting layer and producing an insulating layer therein, a process of forming a p side electrode for the light absorption layer and a p side electrode for the phase correcting layer on the p type InP layer, and a process of forming an n side electrode on the n type InP substrate. Thereby, a semiconductor light intensity modulator having no phase modulation and having high performance and high reliability can be produced.

What is claimed is:

1. A semiconductor light intensity modulator comprising:

a light absorption semiconductor layer having an energy band gap and absorbing light in response to an electric field applied to said light absorption semiconductor layer for modulating light passing through said light absorption semiconductor layer; and a phase correcting semiconductor layer coplanar with and receiving light passing through said light absorption semiconductor layer and having a larger energy band gap than the energy band gap of said light absorption semiconductor layer and changing refractive index in response to an electric field applied to said phase correcting semiconductor layer for changing the phase of light passing through said phase correcting semiconductor layer, electric fields being independently applicable to said light absorption and phase correcting semiconductor layers and wherein said phase correcting semiconductor layer is longer in the direction of light propagation through said semiconductor light intensity modulator than through said light absorption semiconductor layer.

2. The semiconductor light intensity modulator of claim 1 wherein said phase correcting semiconductor layer is contiguous to said light absorption semiconductor layer in the direction of light propagation through said semiconductor light intensity modulator.

3. The semiconductor light intensity modulator of claim 1 wherein said phase correcting semiconductor layer is arranged after said light absorption layer relative to the direction of light propagation through said semiconductor light intensity modulator.

4. A semiconductor light intensity modulator comprising:

a first conductivity type semiconductor substrate having opposed front and rear surfaces;

an undoped light absorption semiconductor layer having an energy band gap, absorbing light in response to an electric field applied to said light absorption semiconductor layer, and disposed on and in contact with part of the front surface of said semiconductor substrate;

a phase correcting semiconductor layer having a larger energy band gap than the energy band gap of said light absorption semiconductor layer disposed on and in contact with part of the front surface of said semiconductor substrate contiguous to said light absorption semiconductor layer, said phase correcting semiconductor layer changing refractive index in response to an electric field applied to said phase correcting semiconductor layer;

a first portion of a second conductivity type, opposite the first conductivity type, contacting semiconductor layer disposed on and in contact with said light absorption semiconductor layer but not contacting said phase correcting semiconductor layer;

a second portion of said second conductivity type contacting semiconductor layer disposed on and in contact with said phase correcting semiconductor layer but not contacting said light absorption semiconductor layer; and a first electrode disposed on the rear surface of said semiconductor substrate, a second electrode disposed on the first portion of said contacting semiconductor layer, and a third electrode disposed on the second portion of said contacting semiconductor layer.

5. The semiconductor light intensity modulator of claim 4 including an electrically insulating material disposed between and mutually electrically isolating the first and second portions of said contacting layer semiconductor layer and disposed on parts of said light absorption semiconductor layer and phase correcting semiconductor layer at a junction of said light absorption and phase correcting semiconductor layers, said electrically insulating layer being disposed between and contacting said first and second parts of said contacting layer.

6. The semiconductor light intensity modulator of claim 4 including two opposed facets wherein said light absorption semiconductor layer and said phase correcting semiconductor layer are each stripe-shaped and together form a stripe extending between the two facets, said contacting semiconductor layer covering side surfaces of the stripe transverse to the front surface of said semiconductor substrate and a top surface of the stripe opposite the front surface of said semiconductor substrate.

7. The semiconductor light intensity modulator of claim 4 wherein said phase correcting semiconductor layer is longer in the direction of light propagation through said semiconductor light intensity modulator of said semiconductor substrate than through said light absorption semiconductor layer.

8. A semiconductor light intensity modulator comprising:

a first conductivity type semiconductor substrate having opposed front and rear surfaces, the front surface having a central projection;

an undoped light absorption semiconductor layer having an energy band gap and absorbing light in response to an electric field applied to said light absorption semiconductor layer disposed on and in contact with part of the central projection at the front surface of said semiconductor substrate;

a phase correcting semiconductor layer having a larger energy band gap than the energy band gap of said light absorption semiconductor layer disposed on and in contact with part of the central projection at the front surface of said semiconductor substrate contiguous to said light absorption semiconductor layer, said phase correcting semiconductor layer changing refractive index in response to an electric field applied to said phase correcting semiconductor layer;

a first portion of a second conductivity type, opposite the first conductivity type, contacting semiconductor layer disposed on and in contact with part of the front surface of said semiconductor substrate, on one side of said projection, and contacting said light absorption semiconductor layer but not contacting said phase correcting semiconductor layer;

a second portion of said second conductivity type contacting semiconductor layer disposed on and in contact with part of the front surface of said semiconductor substrate at a side of said projection opposite the first portion of said contacting semiconductor layer, and contacting said phase correcting semiconductor layer but not contacting said light absorption semiconductor layer; and a first electrode disposed on the rear surface of said semiconductor substrate, a second electrode disposed on the first portion of said contacting semiconductor layer, and a third electrode disposed on the second portion of said contacting semiconductor layer.

9. The semiconductor light intensity modulator of claim 8 including an electrically insulating material disposed between and mutually electrically isolating the first and second portions of said contacting semiconductor layer and disposed on parts of said light absorption semiconductor layer and phase correcting semiconductor layer at a junction of said light absorption and phase correcting semiconductor layers, said electrically insulating layer being disposed between and contacting said first and second parts of said contacting layer.

10. The semiconductor light intensity modulator of claim 8 wherein said phase correcting semiconductor layer is longer in the direction of light propagation through said semiconductor light intensity modulator of said semiconductor substrate than through said light absorption semiconductor layer.

11. A semiconductor light intensity modulator comprising:

a first conductivity type semiconductor substrate having opposed front and rear surfaces, the front surface having a central projection;

a phase correcting semiconductor layer disposed on and covering the central projection of said semiconductor substrate;

a first electrically insulating layer disposed on part of the front surface of said semiconductor substrate on one side of the central projection, contacting said semiconductor substrate, said central projection, and said phase correcting semiconductor layer;

a second conductivity type, opposite the first conductivity type, contacting semiconductor layer disposed on said phase correcting semiconductor layer and said first electrically insulating layer;

a light absorption semiconductor layer disposed on part of said second conductivity type contacting semiconductor layer directly opposite said phase correcting semiconductor layer;

a first conductivity type contacting semiconductor layer disposed on said light absorption semiconductor layer;

a second electrically insulating layer disposed on and contacting part of the front surface of said semiconductor substrate at a side of the central projection opposite said first electrically insulating layer, and contacting said phase correcting, second conductivity type contacting semiconductor, light absorption semiconductor, and first conductivity type contacting semiconductor layers; and a first electrode disposed on the rear surface of said semiconductor substrate, a second electrode disposed on said second conductivity type contacting layer, and a third electrode disposed on said first conductivity type contacting semiconductor layer.

12. The semiconductor light intensity modulator of claim 11 wherein said phase correcting semiconductor layer and said light absorption semiconductor layer have respective thicknesses transverse to the front surface of said semiconductor substrate and said phase correcting semiconductor layer is thicker than said light absorption semiconductor layer.

* * * * *